United States Patent

Fairbanks

[15] 3,644,239

[45] Feb. 22, 1972

[54] RETICULATED NYLON STRUCTURES

[72] Inventor: Theodore H. Fairbanks, West Chester, Pa.

[73] Assignee: FMC Corporation, Philadelphia, Pa.

[22] Filed: July 17, 1969

[21] Appl. No.: 842,663

Related U.S. Application Data

[62] Division of Ser. No. 641,769, May 29, 1967, Pat. No. 3,496,266.

[52] U.S. Cl..............................260/2.5, 264/54, 264/232, 264/288, 264/321, 264/340
[51] Int. Cl. ..................B29d 27/00, B29h 7/20, B29c 25/00
[58] Field of Search................................264/321; 260/2.5 M

[56] References Cited

UNITED STATES PATENTS 3,403,203    9/1968    Schirmer ................................264/321

FOREIGN PATENTS OR APPLICATIONS 266,422    7/1964    Netherlands..........................264/321

OTHER PUBLICATIONS

Rubber and Plastics Age, Vol. 43, No. 2, Feb. 1962, pg. 141.

*Primary Examiner*—Samuel H. Blech
*Assistant Examiner*—Morton Foelak
*Attorney*—Thomas R. O'Malley, George F. Mueller and Eugene G. Horsky

[57] ABSTRACT

A reticulated nylon structure formed of strands integrally interconnected by thickened strand junctures at spaced-apart points so as to form the skeletal structure of a multitude of polyhedrons whose faces are polygonal, are common to a polyhedron adjacent thereto, and are open and substantially free of membranes, with such structure being suitable, for example, as a filter.

2 Claims, 3 Drawing Figures

RETICULATED NYLON STRUCTURES

This application is a division of my application Ser. No. 641,769, filed May 29, 1967. Now U.S. Pat. No. 3,496,226 granted Feb. 17, 1970.

The present invention is directed to reticulated nylon structures, and particularly reticulated nylon webs.

Reticulated structures, and particularly reticulated polyurethane foams, are disclosed in the prior art. The U.S. Pat. No. 3,171,820 to Volz discloses a number of methods for producing reticulated foams. One method disclosed in the Volz patent involves subjecting a foamed opened cell, cellular polyurethane foam to the hydrolytic action of water in the presence of a hydrolysis catalyst which accelerates the hydrolytic action until at least substantially all membraneous polyurethane is removed from the foam. Another method described by Volz involves passing a high-temperature flame front, generated by an expanding gas mixture, through a membrane-bearing, open-celled polyurethane foam. Still another method disclosed by Volz involves a prolonged exposure of an open-celled polyurethane foam to noncatalyzed aqueous hydrolytic conditions at about room temperature. In a still further method mentioned in the Volz patent, an open-celled polyurethane foam is heated in the presence of steam for a prolonged period.

A U.S. Pat. No. 3,175,025, to Green is also directed to a process for making reticulated polyurethane structures which comprises providing a combustible mixture of an oxidizer material and an oxidizable material within a cellular polyurethane material having heat-destructible membranes and thereafter igniting the mixture to thereby produce a reticulated structure.

In another U.S. Pat. No. 3,175,030 to Green a method is described in which an open-celled polyurethane foam is subjected to a light pulse of sufficient intensity or energy to remove some portion of or all of the cell membranes.

As indicated by the above patents, the prior art is primarily concerned with reticulated polyurethane structures and, while such structures are suitable for various uses including fluid filtering, their applications are greatly limited by the aging instability of polyurethane and the comparatively low strengths of the reticulated polyurethane structures. Accordingly, a primary object of this invention is to provide a new or improved and generally more satisfactory reticulated structure formed of nylon.

Another object is to provide a reticulated nylon web.

Still another object is the provision of a reticulated web of nylon in which the molecules thereof are oriented to impart to the web improved strength and smooth fabriclike properties.

Still further objects will appear in the following description of the invention.

The reticulated nylon structure of the present invention is provided by a method in which a foamed nylon material having contacting cells which together provide a skeletal structure formed of a network of interconnected strands and membranes of windows joined to the skeletal structure and partitioning contiguous cells, is exposed to an aqueous solution of a phenol until the membranes or windows are partially, and preferably substantially, completely removed. The strands and their junctures are of greater thickness than the cell membranes and thus maintain the integrity of the network of interconnected strands throughout this treatment.

This network of nylon strands and the somewhat thicker strand-interconnecting junctures which are recovered define a skeletal or reticulated structure which can perhaps be best visualized as consisting of a plurality of polyhedrons having polygonal faces, each of which is common to adjacent polyhedrons and being substantially free of membranes or windows.

Preferably, and particularly in the case of a nylon web, the closed-cell foamed nylon material is stretched at least along one and desirably along both of its axial directions to induce orientation of the molecules thereof. Such stretching provides the finished reticulated structures with a smooth, fabriclike appearance and, more important, the molecular orientation imparts greater strength to the skeletal structure than it would otherwise possess. Of still further significance, stretching of the closed-cell foamed nylon material reduces the thickness of the cell membranes and may perhaps cause some of the membranes to rupture, thus permitting the treating solution to more rapidly penetrate into the foam material.

The reticulated nylon structure of the present invention is not dependent upon the particular degree, rate, or manner of stretching of the closed-cell nylon material prior to or during its treatment. Of course, if a finished reticulated structure having high-strength characteristics is desired, the nylon material is stretched to its maximum degree without inducing tearing. On the other hand, if stretching of the nylon material is performed primarily to enlarge the openings or pores thereof, the degree of stretching can be adjusted accordingly. Stretching of the closed-cell nylon material along biaxial directions can be effected in two separate stages with the initial stretch extending either longitudinally or transversely of the material, or the material may be stretched simultaneously along both of its axial directions without substantially affecting the characteristics of the finished reticulated material.

Preferably, the nylon material, once stretched, is held in its extended condition during its treatment with the solution of the phenol. In this manner, relaxation of the stretched material during treatment is avoided and more rapid and uniform penetration of the treating solution is obtained. In applications where strength is a prime consideration, it is preferred that the reticulated material can be further tensioned, as for example from about 1 percent to 10 percent, after its treatment with the solution of the phenol to remove any residual elongation which may exist in the material and thus assure that the highest degree of orientation is achieved.

The duration of exposure of a foamed nylon material to the treating solution will, of course, vary with such factors as the concentration of phenol in the solution and the solution temperature. Any water-soluble aromatic phenolic compound may be employed in the practice of the present invention. However, phenol itself has been found to provide for rapid removal of cell membranes of foamed nylon material with a minimum of degradation of the remaining skeletal or reticulated structure and is therefore preferred.

Desirably, the concentration of the phenolic compound, such as for example, phenol, in the aqueous treating solution can be varied to provide a solution containing from about 0.5 to 10 percent (saturation) of phenol, and preferably from about 5 to 8 or 10 percent of phenol. The amount employed, however, will depend upon the temperature of the solution, which itself may vary from 10° to 90° C., with a temperature of about 60° C. being preferred.

The larger the concentration of the phenol in the treating solution, the more rapid is the rate of foam reticulation. However, as the concentration of the phenol in the treating solution approaches and exceeds the saturation level, the solution separates into two phases, one part consisting of phenol dissolved in water, while the other includes water dissolved in the phenol.

Increasing amounts of the phenol can be dissolved by the addition of a strong base, such as NaOH, KOH, etc. The amount of base added will range between that which will fully dissolve the phenol which is present and that which will bring the proportion of moles of base to moles of the phenol to about 1:2.3. In this manner, the concentration of phenol and/or phenol ions in the solution can be increased to about 19 percent and more. A molar proportion of base to phenol below the minimum of about 1:2.3 was found to be only marginally active in reticulating of nylon foams. On the other hand, exceeding the solubility of phenol generally results in uneven and excessive attack on portions of the nylon foam network and, for most purposes, is undesirable.

With treating solutions within the range of conditions noted above, the duration of exposure of a stretched foamed nylon material will extend for about 0.1 seconds to 10 seconds, and under the preferred conditions a 1-second treatment is sufficient.

Immediately after exposure to the treating solution for the period necessary to effect removal of the cell membranes or windows, the remaining skeletal or reticulated nylon structure is washed in a bath of hot water, which may also contain a small amount of base to arrest the action and assist in the removal of the solution therefrom. When an after-stretching of the reticulated nylon structure is necessary or desirable, it is preferably achieved during the cleaning of the structure within the hot water bath. Drying of the washed reticulated structure may be effected in any convenient manner, such as by blowing heated air through the structure.

The resulting reticulated nylon structure possesses better stability to aging than polyurethane foams and can be advantageously employed in filtering both liquids and gases. The reticulated nylon structures of the present invention and particularly those which have molecular orientation, are adapted also for a variety of other uses, such as heat-insulating fabrics, mats, pads, screens, etc.

Figures 1, 2:
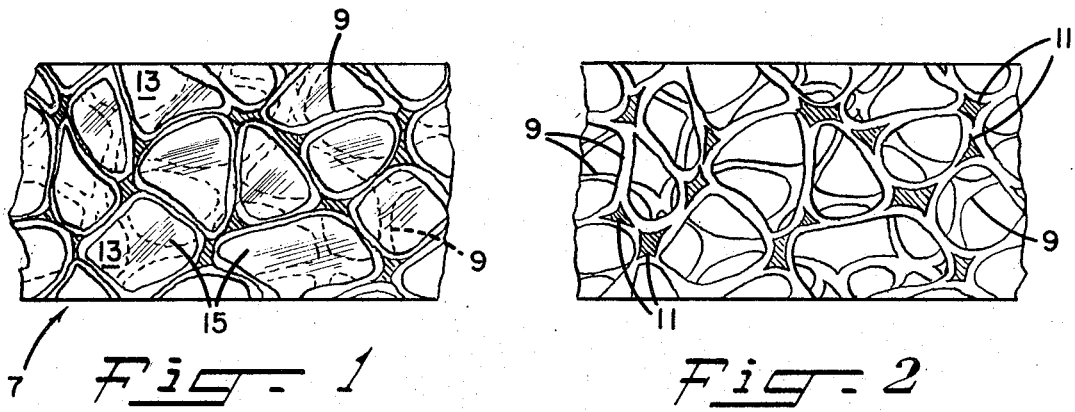
FIG. 1 is a fragmentary view, on an enlarged scale, of a section of a closed-cell cellular or foamed nylon material prior to being reticulated.
FIG. 2 is a view similar to FIG. 1 illustrating the three-dimensional reticulated nylon material of the present invention.
Figure 3:
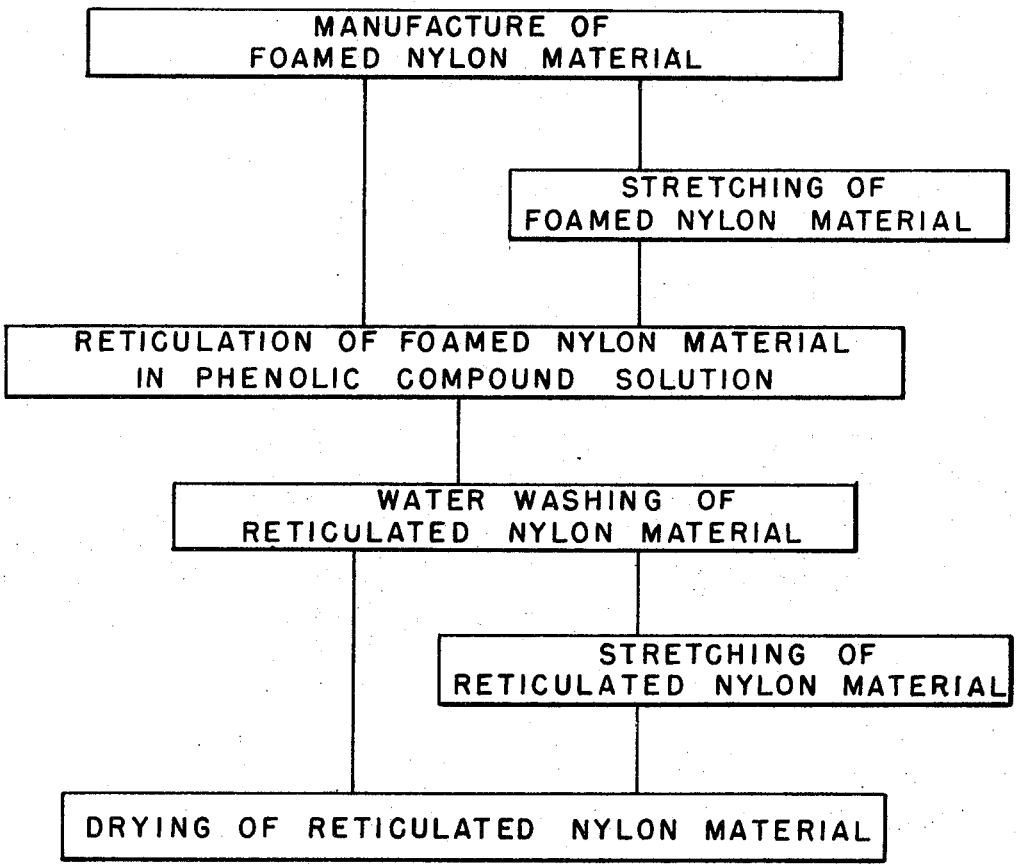
FIG. 3 is a diagram showing the steps employed in providing the reticulated structure shown in FIG. 2.

In the production of a cellular nylon material as shown in FIG. 1 of the drawing a solid chemical blowing agent, such as azodicarbonamide, sold under the name of "Kempore" 125 by National Polychemical Ind., or p, p'-oxi-bis (benzenesulfonyl hydrazide), sold under the name of "Celogen" by Naugatuck Chemical Company, is incorporated into a polyamide or nylon resin of the polyhexamethylene-diamine-adipic acid type, such as nylon 66, or the poly-5-aminocaproic acid type, such as nylon 6. Such solid chemical blowing agents can be conveniently and uniformly applied as a powder or dust onto the surfaces of nylon resin pellets which may have been pretreated, as for example with mineral oil.

This mixture of nylon resin and solid chemical blowing agents is then charged into an extruder, heated to a molten condition while being mixed under pressure, and then extruded through a slot or other orifice into a zone of lower pressure, such as the ambient room atmosphere. The blowing agents decompose when heated and thus generate gases which serve to expand or foam the nylon resin as it issues into the zone of lower pressure. The extruded foamed nylon material or web is then cooled, as by contact with a chilled roller or within a quench bath. The resulting foamed nylon web is of generally closed-cell cellular construction.

As more fully described in U.S. Pat. No 3,251,911 solid chemical blowing agents, such as those mentioned above, decompose exothermally when heated and elevate the temperature of the thermoplastic material locally. It is in these heat centers that nucleation of the generated gases occurs and at which expansion or foaming of the molten nylon resin takes place as it issues from the extruder. Nucleation of gases within the molten resin can also be obtained by incorporating into such resin discrete particulate matter which is insoluble in the resin itself.

Of course, by increasing the number of nucleation sites which are present in the molten resin, a greater number of cells are formed when such resin expands. These cells, however, are of smaller size and are more uniformly distributed. Thus, in preparing the foamed nylon web it is preferred that metal powders, such as zinc dust, be intermixed with the nylon resin, along with the solid chemical blowing agent, to insure that the resulting foamed nylon web have a uniform distribution of fine or small cells.

As shown in FIG. 1 of the drawing, a foamed nylon web 7, which has been formed as described above, includes strands 9 which are interconnected at junctures 11 to provide a network structure, and thin membranes or windows 13 which extend between the strands 9 and partition adjacent cells 15 from each other.

The nylon web 7 is preferably stretched in a convenient manner, and desirably to equal degrees, in directions extending along both its longitudinal and transverse axes to effect orientation of the molecules. As heretofore mentioned, stretching of the foamed nylon web is not necessary for producing a satisfactory reticulated nylon structure but is preferred in view of the greatly improved strength properties which are exhibited by the finished reticulated structure.

With the foamed nylon web maintained in its extended or stretched condition, it is immersed or otherwise exposed to an aqueous solution containing about 0.5 to 10 percent (saturation), and desirably from about 5 to 8 or 10 percent of phenol. Alternatively, the treating solution may also include a strong base, such as NaOH or KOH, in a molar proportion to the phenol of about 1:2.3, to thereby increase the solubility and thus the concentration of the phenol which such solution may contain. The temperature of the treating solution may range from about 10° C. to about 90° C., and, for the sake of ease of operations and simplicity, is desirably at about 60° C. While the duration of web immersion in the phenol solution can be varied, under the preferred conditions exposure of the net for about 1 second will be adequate.

As heretofore mentioned, the phenol solution removes the membranes or windows 13 of the foamed nylon web, leaving behind a structure formed of a network of interconnected strands 9, as shown in FIG. 2. The cell membranes of the foamed nylon web are much thinner than the strands 9 and the still thicker strand junctures 11 and thus are rapidly removed without causing serious degradation in the remaining skeletal structure.

Immediately following this treatment, this now reticulated web structure is washed in a bath of hot water, preferably containing a small amount of base to arrest the action and remove the phenol solution therefrom. While within this wash bath, the reticulated nylon web is preferably extended to insure that maximum stretching and molecular orientation has been achieved. The manufacture of the reticulated web is now completed and dried, as by warm air, and collected or cut into sections.

The invention is illustrated by the following specific examples:

EXAMPLE I

A blend consisting of 1,000 grams of nylon-6 resin, sold under the name of "Plaskon" by Allied Chemical Company, 10 grams of azodicarbonamide, sold under the name of "Kempore" 125 by National Polychemical, Indiana, and 10 grams of fine zinc powder was charged into a ¾-inch "Wayne" bench top extruder, an extruder manufactured by Wayne Machinery and Die Company of Garfield, N.J. At the exit of the extruder barrel was located a die having a slit shaped to provide a web 1 inch in width and 6 mils in thickness and modified so as to have its internal cross section gradually decrease from its entrance to its exit.

The extruder was heated at three zones, with the rear portion of the barrel (entrance) being maintained at 215° C. while the front portion of the barrel and die were heated to 282° C. To obtain maximum back pressure immediately upstream from the die slit, the extruder screw was operated at full speed.

The molten nylon resin foamed as it issued from the extrusion die slit and into the ambient room atmosphere and was quenched as a web on a rotating chill roller. This quenched molten nylon resin had a uniform distribution of small cells indicating that the azodicarbonamide, together with the zinc powder, provided for good nucleation of the gases generated within the molten resin.

A longitudinal stretch of 100 percent of the foamed nylon web was achieved by passing the same over a series of differential speed rolls, afterwhich the web was stretched 150 percent in a transverse direction by means of a conventional tenter frame.

While still under tension, the foamed and now oriented nylon web was immersed for 1 second in an aqueous solution of about 5 percent, by weight, of phenol which was at room temperature. This treatment achieved the desired removal of the cell membranes leaving a reticulated structure formed of interconnected strands which was then washed with water heated to 70° C. and containing 0.1 percent NaOH to neutralize the phenol solution. During the washing step the reticulated nylon web was further stretched about 2 percent. The finished reticulated nylon web was then dried and found suitable for use as a filtering medium.

EXAMPLE II

An oriented foamed nylon web, formed as described in Example I, was immersed in a solution containing 12 grams of phenol and 100 cc. of water. This solution, however, separated into two phases, one containing phenol dissolved in water and the other water dissolved in phenol. Upon the addition of 5 grams of NaOH, the phenol-rich phase was completely dissolved and rendered the solution clear and homogenous. However, desired reticulation of the foamed nylon net could not be achieved in such base-containing solution, even after a 5-minute period of immersion.

Additional amounts of 4, 6, 8 and 10 grams of phenol were successively added to the base-containing solution and, while the solution remained clear and homogenous, it did not effect reticulation of the foamed nylon sample. Upon the addition of 2 more grams of phenol, this solution was still clear and homogenous and was found to be highly effective in achieving the desired reticulation of the foamed nylon web.

This final solution contained a total of 24 grams of phenol to 5 grams of NaOH, a weight ratio of 4.8 to 1 or a 2.3 to 1 in molar proportion. The concentration of phenol and/or phenol ions was about 18.6 percent by weight.

EXAMPLE III

To show the minimum molar ratio of 1 to 2:3 of base to phenol, a solution of 6 grams of phenol and 2.5 grams of NaOH in 100 cc. of water was found to be inactive in effecting reticulation of an oriented foamed nylon web which was formed as described in Example I. Upon the addition of 6 grams of phenol to provide a mole ratio of base to phenol of 1:2.3, the solution was effective in achieving reticulation and had a phenol concentration of 10.25 percent, by weight.

A similar solution containing 22 grams of phenol and 10 grams of NaOH in 100 cc. of water (16.7 percent phenol by weight) did not give rise to reticulation of an oriented foamed nylon web. Such web could be reticulated, however, upon adding of 26 grams of phenol giving a 1 to 2.3 mole ratio of NaOH to phenol.

EXAMPLE IV

A sample of unstretched, closed-cell nylon foam was examined under a low-power microscope, where it was observed that at least 95 percent of the membranes at the surface were intact. The sample was then immersed for 10 seconds in a solution containing 5 g. NaOH, 30 g. phenol, and 100 cc. $H_2O$. It was then rinsed immediately in water. It was then dipped twice more in the solution, rinsing thoroughly each time. The treated sample was then examined microscopically again, when it was seen that between 50 and 75 percent of the surface membranes had been opened, giving a substantial degree of porosity at the sample surface.

I claim:

1. A reticulated structure formed of a network of interconnected strands of a nylon resin, said strands being integrally interconnected by thickened junctures at spaced-apart points so as to form the skeletal outline of a multitude of polyhedrons whose faces are polygonal, are common to a polyhedron adjacent thereto and are open and free from membraneous nylon resin.

2. An article as defined in claim 1 wherein the molecules of said interconnecting strands are at least partially oriented.

* * * * *

PO-1050
(5/69)

UNITED STATES PATENT OFFICE
CERTIFICATE OF CORRECTION

Patent No. 3,644,239     Dated February 22, 1972

Inventor(s) Theodore H. Fairbanks

It is certified that error appears in the above-identified patent and that said Letters Patent are hereby corrected as shown below:

Col. 1, line 3, delete the period after "1967"; line 3, "Now" should read -- now --; line 3, "3,496,226" should read -- 3,496,266 --; line 25 and 32, "Green" should read -- Geen --; line 56, "of" should read -- or --. Col. 2, line 28, delete "can". Col. 4, line 48, "Indiana" should read -- Ind. --.

Signed and sealed this 27th day of June 1972.

(SEAL)
Attest:

EDWARD M. FLETCHER, JR.
Attesting Officer

ROBERT GOTTSCHALK
Commissioner of Patents